United States Patent [19]

Kalk et al.

[11] Patent Number: 4,480,302
[45] Date of Patent: Oct. 30, 1984

[54] OPTICAL RECORDING MEDIA

[75] Inventors: Franklin D. Kalk; Boris J. Muchnik; Doyle W. Johnston; Fred W. Spong, all of Boulder, Colo.

[73] Assignee: Storage Technology Corporation, Louisville, Colo.

[21] Appl. No.: 427,326

[22] Filed: Sep. 29, 1982

[51] Int. Cl.$^3$ ............................................. G01D 15/32
[52] U.S. Cl. .................................. 346/135.1; 346/137; 369/111; 369/277; 369/284
[58] Field of Search .................. 346/137, 135.1, 76 L; 369/277, 278, 279, 280, 283, 284, 111, 275

[56] References Cited

U.S. PATENT DOCUMENTS

| | | | |
|---|---|---|---|
| 4,074,282 | 2/1978 | Balas | 346/135.1 |
| 4,264,911 | 4/1981 | Wilkinson | 346/135.1 |
| 4,308,545 | 12/1981 | Lehureau | 346/135.1 |

FOREIGN PATENT DOCUMENTS 2321164 11/1977 France .

Primary Examiner—Joseph W. Hartary
Attorney, Agent, or Firm—Bryant R. Gold

[57] ABSTRACT

Laminated optical recording medium that provides desired optical properties in combination with pregrooved channels that define data tracks on which data may be written. Annular or spiral grooves are selectively placed on a base disc substrate. A recording layer is deposited on a transparent disc substrate. The two disc substrates are then bonded together so that the recording layer on the transparent disc substrate confronts the grooves on the base disc substrate. The covered grooves thus form chambers exposed to the recording layer. Prior to bonding the two disc substrates together, the chambers may be filled with an inert gas. A rigid support disc, such as is made from aluminum, may optionally be bonded to the underside of the grooved base disc substrate.

12 Claims, 3 Drawing Figures

OPTICAL RECORDING MEDIA

BACKGROUND OF THE INVENTION

This invention relates to optical recording media for use with optical systems wherein a focussed laser beam mechanically scans the recording medium to either write or read information thereto or therefrom. Such optical recording media is typically, but not necessarily, in the form of a disc. However, for concreteness, the invention will be presented within the context of what is commonly known as "optical disc redording."

In optical recording it is desirable to have a recording medium that is sensitive to a source of optical energy, such as a laser beam, yet is inherently protected from dust particles, as well as any other forms of particles or undesirable conditions resulting from the manual handling environment to which the media must be subjected. In addition, it is desirable to have pilot tracks on the unrecorded disc for purposes of developing a signal for track-following servos. It is also desirable, in order to achieve good sensitivity in many types of optical recording media, to leave a free surface on one side of an active layer, the "active layer" being that layer in which the laser energy "writes" information by selectively changing the optical characteristics, or otherwise marking, of the layer. A free surface is desirable because many recording processes are essentially thermal in nature, and the recorded mark is produced when the temperature of an active layer is elevated to some critical temperature by the focused laser recording beam. For example, a typical marking mechanism is the perferation of, or "hole forming" in, the active layer. In such thermal recording processes, a key characteristic limiting the sensitivity of the media is the thermal diffusion of energy away from the local spot to be heated. Thus, the thermal confinement of this energy to the region of the spot to be recorded is favored by substrates having low values of thermal diffusivity and by structures in which the active layer has a free surface, since the thermal diffusivity into air, vacuum, or gas is very much less than even into the best insulating solid materials.

The prior art has attempted to meet the objectives stated above by providing dust and handling protection through the use of a thick transparent window such that the external surface upon which the dust collects is always out of focus to the optics used in connection with the laser beam. The use of an active layer having a free surface in order to improve the sensitivity thereof is also known in the art. Both of these features are disclosed, for example, in U.S. Pat. No. 4,074,282. Other patents known to the applicants that provide a similar window to protect a free surface of an active layer include U.S. Pat. Nos. 4,264,911 and 4,308,545.

There are, however, several problems associated with the configurations shown in the above-referenced patents, for which it is the objective of this invention to overcome. For example, if the window is made of glass it is subject to catastrophic failure during handling or during operation when the disc might be rotating at speeds in excess of 2000 rpm. On the other hand, if the window is made of plastic, it is subject to plastic creep due to the high centrifugal stresses that are involved in speeds in excess of 2000 rpm. Furthermore, since the window typically spans a radial distance between supports of two or three inches, the window must be significantly thick not to be plagued by vibrating modes of the "drumhead" type. In addition, the dimensional tolerances of windows, particularly thick windows, become very stringent for systems using high numerical apperature focusing objectives. That is, it is difficult to obtain transparent optical plastics meeting the required tolerances on thickness variations at thicknesses sufficient to be rigidly self supporting.

SUMMARY OF THE INVENTION

Accordingly, it is an object of the present invention to provide improved optical recording media that is sensitive to optical enery of the desired type and that includes pilot tracks on the unrecorded disc that can be followed by track-following servos.

A further object of the present invention is to provide such improved optical recording media that is inherently protected from dust and other undesirable particles and conditions that result from the varied environment in which the disc must be stored and handled.

Still a further object of the present invention is to provide the above-described improved media in an embodiment that is especially immune to catastrophic failures, such as breakage, creep, or excessive vibrations, resulting from the manual handling of the disc, or during the normal operation of the disc at high rotational speeds.

Another object of the present invention is to provide improved optical recording media that can be inexpensively manufactured without the need of unduly thick windows (which thick windows are used in the prior art to overcome undesirable vibrating modes and to provide sufficient strength) or unduly tight dimensional tolerances or thickness variations.

Still another object of the present invention is to provide a method of easily manufacturing optical media having the above-described desirable characteristics.

The above and other objects of the present invention are realized in a prefered embodiment that includes a base substrate that is grooved and bonded at the grooved peaks to a window, which window serves as a substrate for an active layer or layers. The active layer or layers face inwardly towards the grooves of the base substrate. Recording is achieved in the active layer in the regions of the valleys of the grooves where the active layer has a free surface. The active layer is partially transmitting so that the reflectivity, as viewed from the top side of the window, varies from contacting to non-contacting regions. Sensitivity is optimum between contacts (grocve valleys) and poor in the region of contact (groove peaks). Thus, a pilot track (a track or region of poor sensitivity) exists for each data track.

Advantageously, the optical recording medium as above described, and as described more fully herein, allows the window to be securely bonded and supported. Hence, flexibility of the window is no longer a problem, and the thickness of the window can be choosen purely on the basis of optical rather than mechanical considerations. A further advantage is that the active layer has free surface in the regions to be recorded. Another advantage is that the contacting regions (the grooved peaks) provide both support to the window as well as a region of poor sensitivity that defines pilot tracks for tracking servos. A still further advantage is that because the window is securely bonded to the support structure at numerous locations, the window could be made of glass at far less risk than in the prior art. The use of glass for a window material would not only provide some advantages with respect to optical quality, but would also provide the advantage of hermetic sealing. This is because plastics are typically permeable, to one degree or another, to water, oxygen, and other gasses, while glass is not. Thus, achieving a good hermetic seal is an important feature if the optical media is to have good archival stability.

In one embodiment of the invention, the groove support disc may be made from plastic. This plastic support disc can then be bonded to an aluminum base plate for greater mechanical strength and dimensional integrity. By using plastic for the base substrate in this fashion, the grooved surface may be inexpensively made by using well known molding or stamping techniques that have heretofore been used with audio and video discs. Also, in this embodiment, the temperature coefficients of the layer materials may be selected to match.

BRIEF DESCRIPTION OF THE DRAWINGS

The above and other objects, features, and advantages of the present invention will be more apparent from the following more particular description presented in connection with the accompanying drawings, in which.

DETAILED DESCRIPTION OF THE INVENTION

The invention is best understood by reference to the drawings wherein like numerals are used to designate like parts throughout.

Figure 1:
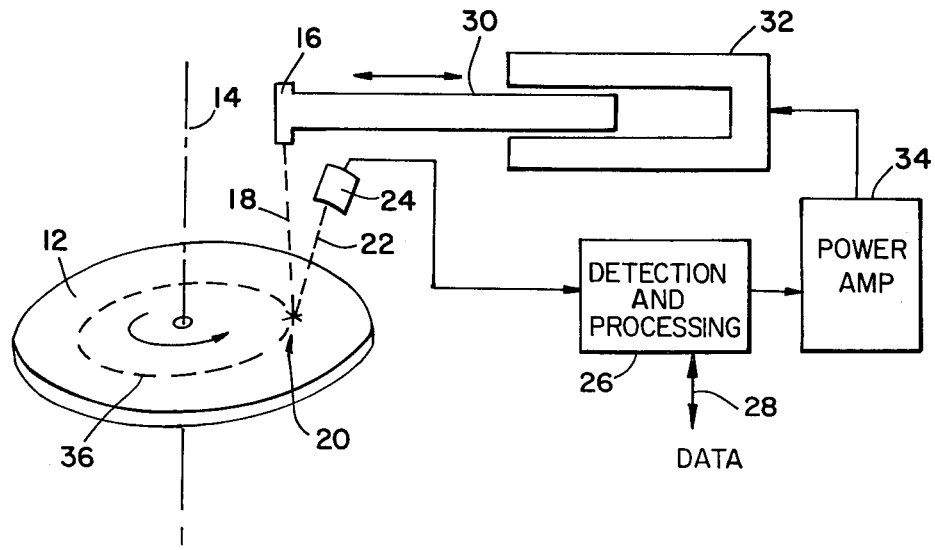
FIG. 1 is a pictorial block diagram of a simplified optical disc system wherein the medium of the present invention may be used.

Referring first to FIG. 1, there is shown a simplified pictorial representation of a basic optical system wherein the improved media of the type disclosed herein may be used. As shown in this simplified system, an optical disc medium 12 is rotatable about an axis 14. A source of optical energy 16, such as a laser, generates an incident beam 18 of radiant energy that strikes a selected point 20 on the surface of the disc 12. During a "write" operation, the intensity of the beam 18 is sufficient to cause the surface of the disc 12 to be appropriately marked (e.g., by the burning of a hole in the active layer thereof) at the desired point 20. During a "read" operation, the intensity of the incident beam 18 is reduced and a reflected beam 22 is detected with a detector 24 in order to determine the presence or absence of a mark at the spot 20. The detector 24 is, in turn, coupled to detection and processing circuitry 26. This circuitry 26 interprets the output of the detector (or detectors) 24 in order to provide data signals 28 representative of the information that has been stored, at designated locations on the disc 12.

Advantageously, the incident beam of radiant energy 18 may scan the surface of the disc 12 so that any spot on the surface thereof may be accessable for read or write purposes. In practice, this scanning may be realized with numerous approaches. For example, the source of radiant energy 16 may be coupled to a linear arm 30 that is selectively moved radially with respect to the disc 12 by a linear motor 32, or equivalent linear actuator. The linear actuator 32 positions the arm 30 in response to control signals received from a power amplifier 34. In turn, the power amplifier 34 responds to signals received from the detection and processing circuitry 26. Thus, a "closed loop" or tracking servo situation exists wherein the positioning of the incident beam 18 with respect to the surface of the disc 12 be selectively and accurately controlled to track a desired region or band, such as the band 36.

Those skilled in the art will recognize that the representation shown in FIG. 1 is grossly simplified. Moreover, in practice several beams of incident radiant energy 18 may be employed. Further, while a slidable head assembly such as is depected in FIG. 1 by use of the slidable arm 30 and the linear motor 32, may be employed to position the incident energy in a coarse manner, complex optical systems also typically require the use of a fine positioning system to selectively and accurately position the incident beam or beams 18 in a precise fashion. For purposes of the present invention, however, FIG. 1 suffices in that it depicts optical recording medium 12 upon which information may be selectively recorded through the use of a scanning beam of radiant energy 18. Reading of media that has been so recorded is achieved by monitoring a reflecting beam of radiation 22. Selective tracking of a desired track on the surface of the disc 12 (such as a track 36 having markedly different reflectivity properties than adjacent areas) may be readily realized by monitoring the reflecting beam 22 and using the "closed-loop" positioning system to cause the incident beam 18 to track the desired location.

Figure 2:
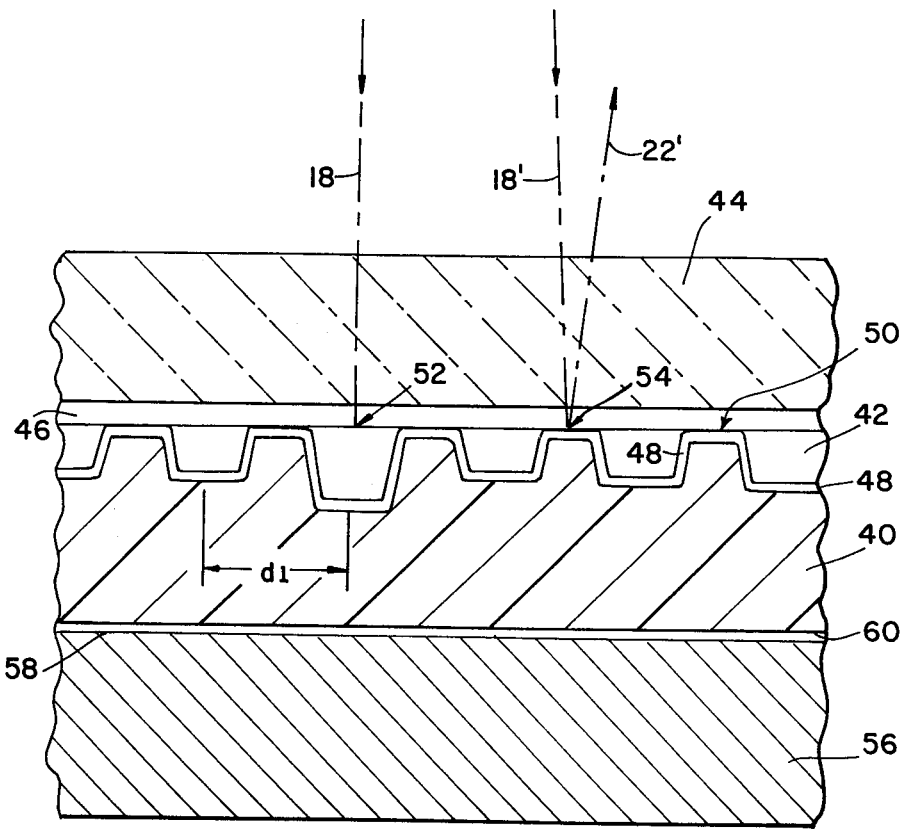
FIG. 2 shows a partial cross-section of the medium of the present invention.

Referring next to FIG. 2, there is shown a partial cross-sectional view of the optical recording medium of the present invention. A base substrate 40 has a plurality of grooves 42 placed along an upper surface thereof. A transparent window 44 overlays the base substrate 40. This window 44 serves as the substrate for an active layer or layers 46. A bonding layer 48 is applied to the grooved surface of the base substrate 40. Contact is made, and the actual bonding occurs, at the grooved peaks, such as is shown at 50. The bonding layer 48 need only be applied to the grooved peaks, i.e., at 50, although in practice it is more easily applied to the entire grooved surface of the substrate 40.

The depth of the grooves 42 is not important to the operation of the present invention. Thus, in FIG. 2 the depth of the grooves shown in the partial cross-sectional view is not uniform. The importance of the grooves is that a free surface be provided for the active layer 46, as is present in the groove valleys, such as at point 52. Further, the groove peaks provide continual points of support for the window 44.

An incident beam of radiation 18 that passes through the window 44 and strikes the active layer 46 at point 52 is not readily reflected, thereby making this energy available to help thermally mark the active layer 46. Moreover, this thermal energy is confined to the point desired because the thermal conductivity within the groove is very low. Perferably, the grooves 42 are filled with an inert gas, such as argon or krypton. Alternatively, all gases may be removed from the groove area, thereby creating a vacuum.

In contrast, an incident beam of radiation 18' that strikes a groove peak, such as at point 54, encounters a boundary condition that readily allows the beam to be reflected back through the window 44 as a reflected beam 22'. Thus, if viewed from the top side of the window 44, the refelctivity varies from contacting regions (such as 54) to non-contacting regions (such as 52). This variable reflectivity defines pilot tracks for each track or band of data. As indicated, the data would actually be written on the disc in the non-contacting regions. The pilot tracks for tracking servos would be provided in the adjacent contacting regions.

Depending upon the type of material used for the base substrate 40, it may be desirable to also include a rigid supporting substrate 56. Such a supporting substrate 56 could be realized from a suitable metal, such as aluminum. The surface 58 of the substrate 56 would typically be machined in order to provide a smooth flat surface. An adhesive layer 60 could then be applied to the upper surface 58 of the supporting substrate 56 in order to bond the base substrate 40 thereto. The use of a metal supporting substrate 56, as shown in FIG. 2, is not required for every application. Nonetheless, greater mechanical strength and dimensional integrety can be realized if such a supporting substrate is employed.

In one embodiment, the distance dl separating adjacent grooves on the upper surface of the base substrate 40 would be on the order of 2 micrometers. Thus, it is apparent that a large number of data tracks (grooves) may be placed on a typical disc 12, which disc may have a 12 to 14 inch diameter. It should also be noted that the grooves 42 may be annular grooves selectively positioned about the center of the disc 12; or they may be a continuous spiraling groove that spirals out from the center of the disc 12. In either event, the groove peaks separate the grooves and provide a region of poor sensitivity. This poor sensitivity advantageously reduces track-to-track cross talk.

Figure 3:
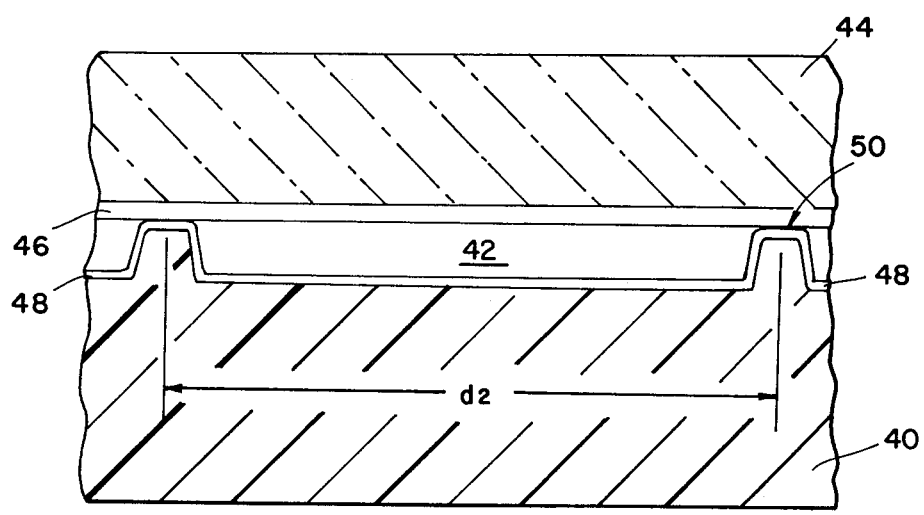
FIG. 3 shows a partial cross-sectional view of an alternative construction of the medium of the present invention.

In FIG. 3, an alternative construction of the medium is shown. In this alternative embodiment, the groove valleys are very wide and are separated by narrow peaks. The groove peaks still provide support for the transparent window 44, although the support points are not as numerous as with the embodiment of FIG. 2. A large number of data tracks may then be written in the area between the grooved peaks. The embodiment of FIG. 3 would be used in systems where the tracking servo only requires 1 pilot servo track for every forty or so data tracks. Thus, the distance d2 might be on the order of 80 micrometers. However, this distance is still sufficient so that the window 44 receives adequate support from the groove peaks. The embodiment of FIG. 3 further offers the advantage of more easily matching the temperature coefficients of the materials used in that the base substrate 40 and window 44 may be made from the same material.

The improved optical recording medium described herein provides several advantages over prior art optical recording media. As mentioned previously, the window 44 is securely bonded and supported. This bonding and support prevents problems due to vibrations of the "drumhead" type, and prevents problems associated with plastic creep (which occurs in unsupported plastic windows). Moreover, the thickness of the window 44 may be chosen purely on the basis of optical rather than mechanical considerations. This allows the medium to function in an optimum manner.

The invention further allows a desirable free surface to exist in the regions of the active layer where recording is to occur. The advantages of such a "free surface" are well known in the art. Advantageously, no significant area of the disc surface is rendered unusable for recording purposes inasmuch as the grooves are spaced approximately the same distance as the data channels would have to be spaced apart in any event. In fact, the present invention improves track-to track isolation (cross talk) in that the grooved peaks define an area of poor sensitivity that acts as a barier between data channels (grooves). Good track-to track isolation has not heretofor been available, to applicants knowledge, in prior art optical recording media.

Further, the groove peaks, in addition to providing isolation between data tracks, as well as support for the window 44, serve as pilot tracks that may be used with tracking servos. These pilot tracks are "built-in" to the structure and exist because of the different reflectivity parameters that exist at the grooved peaks. That is, the variance between the reflectivity of the grooved valleys and grooved peaks is so marked that a suitable tracking scheme, such as is shown in simplified form in FIG. 1, can be used to easily track the location of a selected groove peak.

Finally, because the window 44 is supported at a multiplicity of points, the window 44 could be realized from a glass material rather than plastic. Glass offers several advantages not available with plastic, espcially its ability for hermitically sealing the active layer 46, as well as the inert gas placed in the grooves 42. Such hermetic sealing preserves the optical properties of the medium, thereby improving its archival properties. For example, many problems have been encountered with prior art media using plastic windows in that significant changes have been detected in the optical properties of the media in as short a time as one year. These changes in optical properties are believed to be attributable to the permeable nature of the plastic window. Through the use of the window that provides a true hermetic seal, these problems are alleviated, and the best protection is provided for the disc from dust particles and other adverse environmental conditions.

While the invention herein disclosed has been described by means of specific embodiments and applications thereof, numerous applications and variations could be made thereto by those skilled in the art without departing from the spirit and scope of the present invention. It is therefore to be understood that within the scope of the appended claims, the invention may be practiced otherwise than as specifically described herein.

What is claimed is:

1. An optical recording medium comprising:
    first and second generally planar members, said first planar member being transparent to radiant energy and said second planar member having a plurality of grooves therein that define a plurality of sealed chambers when said planar members are placed in a confronting relationship; and
    a radiant energy-sensitive recording layer overlaying the inwardly facing side of said first member in at least the region of said chambers; and means for holding said first and second planar members in said confronting relationship.

2. Recording medium as defined in claim 1 wherein each of said plurality of grooves is generally circular, and further wherein said plurality of circular grooves is generally concentric.

3. Recording medium as defined in claim 2 further including a planar substrate affixed to the outwardly facing side of said second planar member.

4. Recording medium as defined in claim 3 wherein said planar substrate is made from a rigid metal, such as aluminum.

5. An optical recording medium comprising
a first generally planar disc-shaped member having a plurality of grooves concentrically placed on a top side thereof;
a second generally planar disc-shaped member having a bottom side thereof bonded to the top side of said first disc member, thereby covering the grooves of the first disc member and forming a plurality of concentric chambers at the interface of said first and second disc members, said second disc member being transparent to radiant energy of a desired wavelength; and
a radiant energy sensitive recording layer affixed to the bottom side of said second disc member in at least the region of said chambers;
whereby a controlled beam of radiant energy having the desired wavelength may pass through said second disc member and selectively mark said radiant energy sensitive recording layer.

6. Optical recording medium as defined in claim 5 wherein said chambers are filled with an inert gas.

7. Optical recording medium as defined in claim 5 further including a rigid disc substrate affixed to the bottom side of said first disc member.

8. An optical recording medium comprising:
a transparent substrate;
a recording layer deposited on one side of said transparent substrate, said recording layer comprising a radiation sensitive material that may have information selectively stored therein in response to a controlled beam of radiation that strikes said layer;
a base substrate;
means for supporting the transparent substrate in a spaced-apart relationship with respect to the base substrate such that the recording layer faces the base substrate, and such that support is provided to the transparent substrate at at least three separate spaced-apart support regions along a radial line extending out from a center point of said transparent substrate, each of said support regions along said radial line being separated from an adjacent support region by a non-support region where said transparent substrate is not supported.

9. Optical recording medium as defined in claim 8 wherein said support means comprises a plurality of annular grooves placed around a center point of said base substrate, said base substrate center point being coaxially aligned with said transparent substrate center point, whereby a bottom surface of said grooves is spaced-apart from said recording layer.

10. Optical recording medium as defined in claim 8 wherein said support means comprises a spiraling groove placed around a center point of said base substrate, said spiraling groove making a plurality of revolutions around said base substrate center point, said base substrate center point being coaxially aligned with said transparent substrate center point, whereby a bottom surface of said spiraling groove is spaced-apart from said recording layer.

11. Optical recording medium as defined in claims 9 or 10 wherein said groove(s) are filled with an inert gas.

12. An optical recording medium comprising:
first and second generally planar members, said first planar member being transparent to radiant energy and said second planar member having a spiralling groove therein that defines a spiralling sealed chamber when said planar members are placed in a confronting relationship; and
a radiant energy-sensitive recording layer overlaying the inwardly facing side of said first member in at least the region of said spiralling chamber; and
means for holding said first and second planar members in said confronting relationship.

* * * * *